US006901370B2

(12) United States Patent
Wright

(10) Patent No.: US 6,901,370 B2
(45) Date of Patent: May 31, 2005

(54) SINGLE-SHEET REGISTRATION FORM AND KEY PACKET

(75) Inventor: Ted Eugene Wright, Escondido, CA (US)

(73) Assignee: Electronic Forms Plus, Temecula, CA (US)

( * ) Notice: Subject to any disclaimer, the term of this patent is extended or adjusted under 35 U.S.C. 154(b) by 410 days.

(21) Appl. No.: 10/213,035

(22) Filed: Aug. 5, 2002

(65) Prior Publication Data

US 2003/0042732 A1 Mar. 6, 2003

Related U.S. Application Data

(62) Division of application No. 09/499,069, filed on Feb. 4, 2000.

(51) Int. Cl.[7] .............................................. G06F 17/60
(52) U.S. Cl. .............................................. 705/1; 283/6
(58) Field of Search ............................ 705/1; 283/2, 4, 283/6

(56) References Cited

U.S. PATENT DOCUMENTS 5,377,904 A * 1/1995 Michlin et al. ............... 229/70

FOREIGN PATENT DOCUMENTS

JP 409263076 A * 10/1997 .......... B42D/15/02

OTHER PUBLICATIONS

Proquest search article, Chicago Sun–Time; Aug. 18, 1992; It's check–out Time for Checking In Marriott to Phase Out Front–Desk Registration; Keys Will Meet You at the Door.*

* cited by examiner

*Primary Examiner*—John Weiss
*Assistant Examiner*—Traci Smith
(74) *Attorney, Agent, or Firm*—Olympic Patent Works PLLC

(57) ABSTRACT

A single-sheet registration form and key packet that may be printed on a laser printer or other automated printing device during a registration process conducted by a commercial organization, such as a hotel or motel. The single-sheet registration form and key packet includes lines of perforations for separating the registration form from the key packet and for quickly folding the key packet in order to construct the key packet during the registration process. Additionally, the key-packet portion of the single-sheet registration form and key packet includes dye-cut slots for inserting magnetic key cards and metal keys.

3 Claims, 10 Drawing Sheets

SINGLE-SHEET REGISTRATION FORM AND KEY PACKET

This application is Divisional of Ser. No. 09/499,069 filed on Feb. 4, 2000.

TECHNICAL FIELD

The present invention relates to registration form signed by, and key packets provided to, registrees during a registration process and, in particular, to a single-sheet registration form and key packet that can be automatically printed by a laser printer or other automated printing device.

BACKGROUND OF THE INVENTION

The present invention relates to registration forms generated by a commercial organization, such as a hotel or motel, during the registration process. FIGS. 1A–C illustrate various printed materials presented to a registering hotel guest during a typical registration process. FIG. 1A shows an example currently-used hotel registration form. The hotel registration form is typically printed on dot matrix printers using pre-printed continuous business forms. The dot matrix printer may essentially be dedicated to printing registration forms or, alternatively, registration forms may need to be loaded into the dot matrix printer prior to printing a registration form for a guest. Dot matrix printers are slow and noisy, and the process is relatively expensive. The registration form typically includes a signature line 101 on which the guest signs the guest's name after reading various terms, conditions, and may include other information printed in a text block 102 on the registration form. Information particular to a guest, such as check-in and check-out dates, method of payment, room rates, room number, and other such information may be printed in an information block 103 on the registration form. Alternatively, and commonly, the information particular to a guest may be printed in text block 102, and block 103 may be used for imprinting the guest's credit card or detailing other methods of payment. It should be noted that the types and locations of information printed on the registration form and key packet may vary from one commercial organization to another, and that the registration form and key packet shown in FIGS. 1A–C, and in subsequent figures, are merely examples, and are not intended to show a standard placement or configuration of printed subject matter included in either a registration form or key packet.

When a guest has completed the registration form, the guest is typically provided with a key packet containing a magnetic keycard. FIG. 1B shows a typical key packet as presented to a guest during the registration process. The key packet 110 is normally pre-printed and pre-folded, and includes printed lines 112–113 on which a clerk handling the registration process fills in the room number and guest's name by hand. FIG. 1C shows a typical key packet opened to display the magnetic keycard. As shown in FIG. 1C, a key packet may typically contain additional pre-printed information 115 as well as a glued magnetic keycard pocket 116 into which a magnet keycard 117 is inserted manually by the hotel clerk. The pre-printed key packets are relatively expensive, and handwriting of the guest's name and room number by the hotel clerk adds additional time and potential errors to the registration process. Moreover, because the key packets are pre-printed, key packets are not a flexible medium for presenting time-sensitive and frequently changing information. For example, the key packet shown in FIG. 1C was printed with an advertisement featuring a particular price 118 which has been manually crossed out, and below which a more current price 119 has been manually written by a hotel clerk or another hotel employee. This same lack of flexibility is also characteristic of pre-printed registration forms, such as the registration form shown in FIG. 1A.

Thus, the forms and key packets currently provided to hotel and motel guests during the registration process, and to other types of registrees during other types of registration processes, are relatively expensive, time-consuming to process, and characteristically inflexible media for presentation of information to the registree. For these reasons, hotels and motels, and other commercial organizations that typically carry out registration processes with customers, have recognized the need for a more simple, less expensive, and more flexible method for providing registration forms, key packets, and other types of printed information to registrees.

SUMMARY OF THE INVENTION

One embodiment of the present invention provides a single-sheet registration form and key packet that can be printed on a general-purpose laser printer by a hotel, motel or other commercial organization during a registration process. A portion of the information displayed on the registration form and key packet may be pre-printed, may be printed by the laser printer according to various software templates loaded into the laser printer, or by a combination of pre-printing and software templates. Time-sensitive and frequently changing information, as well as information particular to a registree, may be provided to the laser printer via registration software running on a computer system connected to the laser printer. The registration form and key packet are printed together on a single sheet that includes a vertical line of perforations that divide the single sheet into a registration form and a key packet, a vertical line of perforations and a horizontal line of perforations that allow the key packet to be quickly constructed by folding along the horizontal line of perforations followed by folding along the vertical line of perforations, and two dye-cut slots for holding magnetic keycards and/or metal keys.

DETAILED DESCRIPTION OF THE INVENTION

One embodiment of the present invention provides a single-sheet perforated and slotted registration form and key packet that can be printed on a laser printer or other automated printing device during a registration process. Graphical and textual information printed on the registration and key packet may be pre-printed, generated according to software templates, or printed from information collected during the registration process by registration software running on a computer system connected to the laser printer or other automated printing device.

Figure 2:
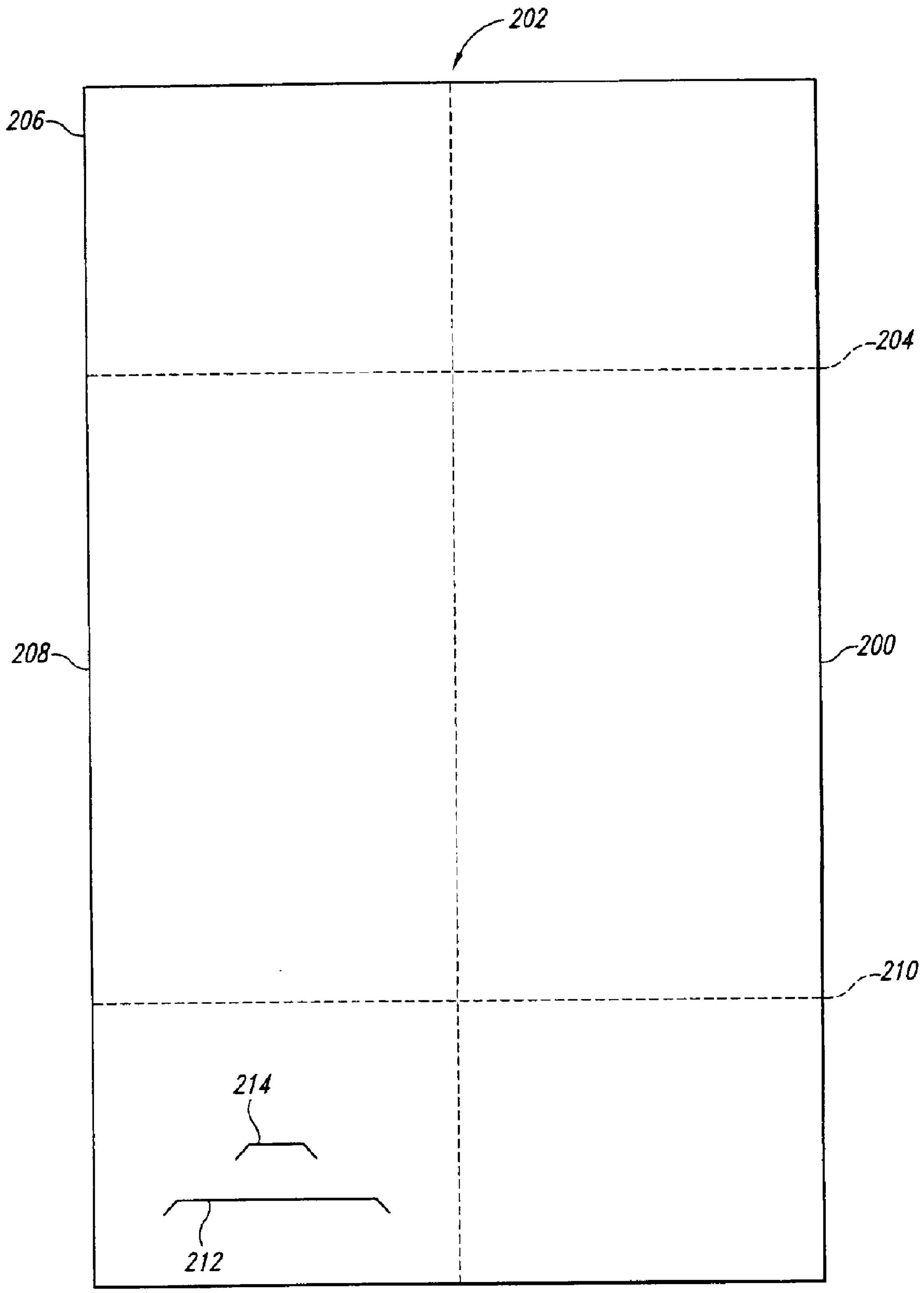
FIG. 2 shows an example single-sheet registration form and key packet representing one embodiment of the present invention without any printed information.

FIG. 2 shows an example single-sheet registration form and key packet representing one embodiment of the present invention without any printed information. The single-sheet registration form and key packet 200 is bisected by a vertical line of perforations 202. The single-sheet registration form and key packet includes a horizontal line of perforations 204 that separates the registration form 206 from the key packet 208. The registration form and key packet may be manually separated, following printing, along this horizontal line of perforations 204. The single-sheet registration form and key packet additionally includes a second horizontal line of perforations 210 that, along with the vertical line of perforations 202, provide folding lines for construction of the key packet, to be discussed and illustrated below. Finally, the single-sheet registration form and key packet 200 includes a dye-cut slot 212 into which a number of magnetic keycards may be inserted, and a second dye-cut slot 214 for insertion of metal keys. Note that, in subsequent figures, the numerical labels used in FIG. 2 will be again used to label identical features of the single-sheet registration form and key packet. In general, once a feature is introduced with reference to a particular numerical label, that numerical label will be used in all subsequent figures for the same feature.

Figure 3:
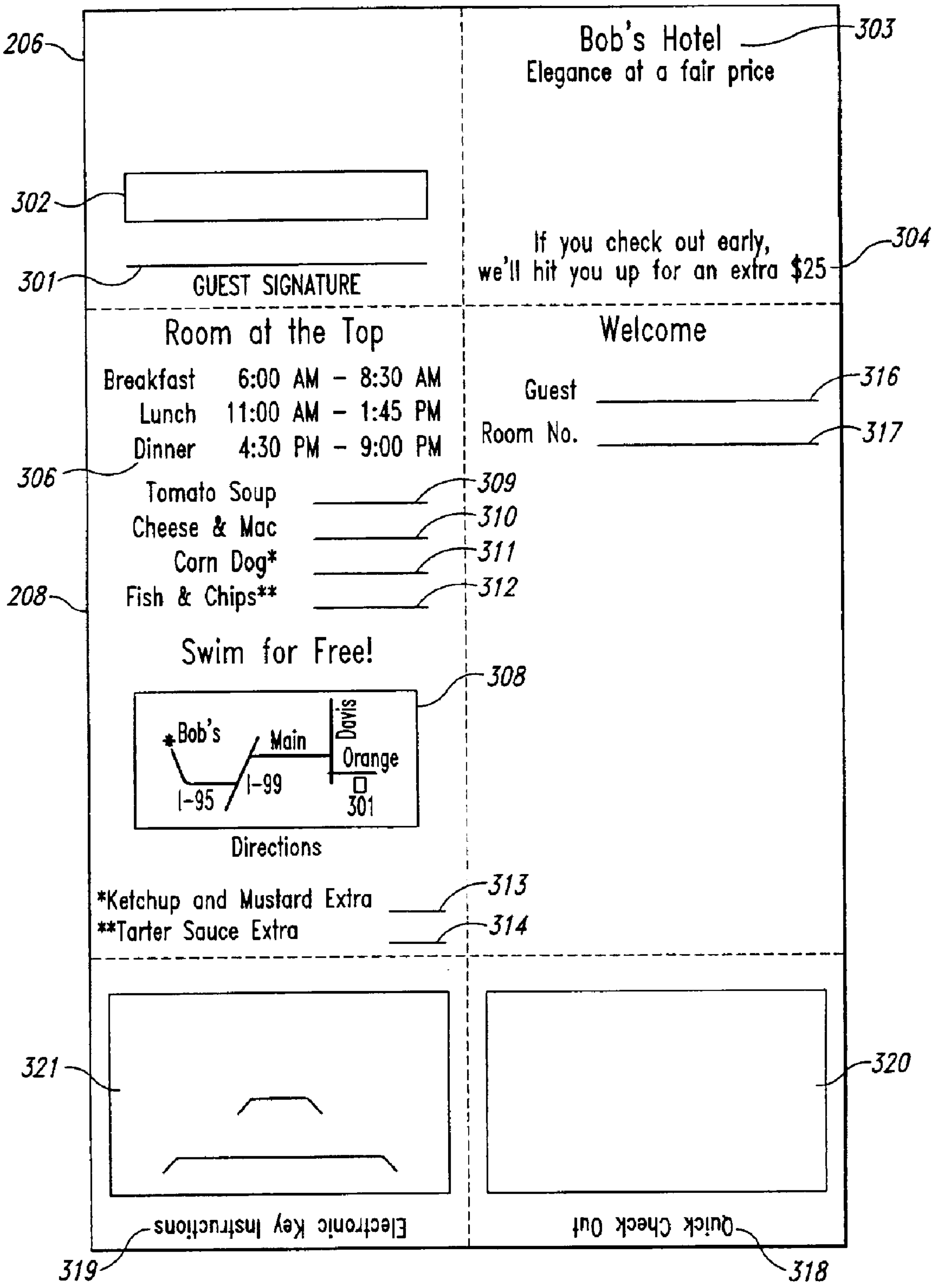
FIG. 3 shows the single-sheet registration form and key packet of FIG. 2 including graphical and textual information that may be either pre-printed by offset printing techniques, or specified in software templates loaded into the laser printer.

FIG. 3 shows the single-sheet registration form and key packet of FIG. 3 including graphical and textual information that may be either pre-printed by offset printing techniques, or specified in software templates loaded into the laser printer. An example single-sheet registration form and key packet of FIG. 3, the registration form 206 includes a guest signature line 301, a text block 302 containing terms, conditions, and other information that the guest may wish to read before signing the registration form, the name of the commercial establishment providing registration 303, and additional information concerning terms and conditions 304. The key packet 208 includes textual information and advertising 306, graphical information and advertising 308, and a number of lines 309–314 above which time-critical or frequently changing information generated during the registration process or available to the registration software during the registration process, may be printed. In addition, the key packet includes lines 316 and 317 above which the guest's name and room number, respectively, may be printed. Finally, the key packet may include additional advertising or information, including text headers 318 and 319 and text blocks 320 and 321 on a lower flap that is folded inward during construction of the key packet.

Figure 1A:
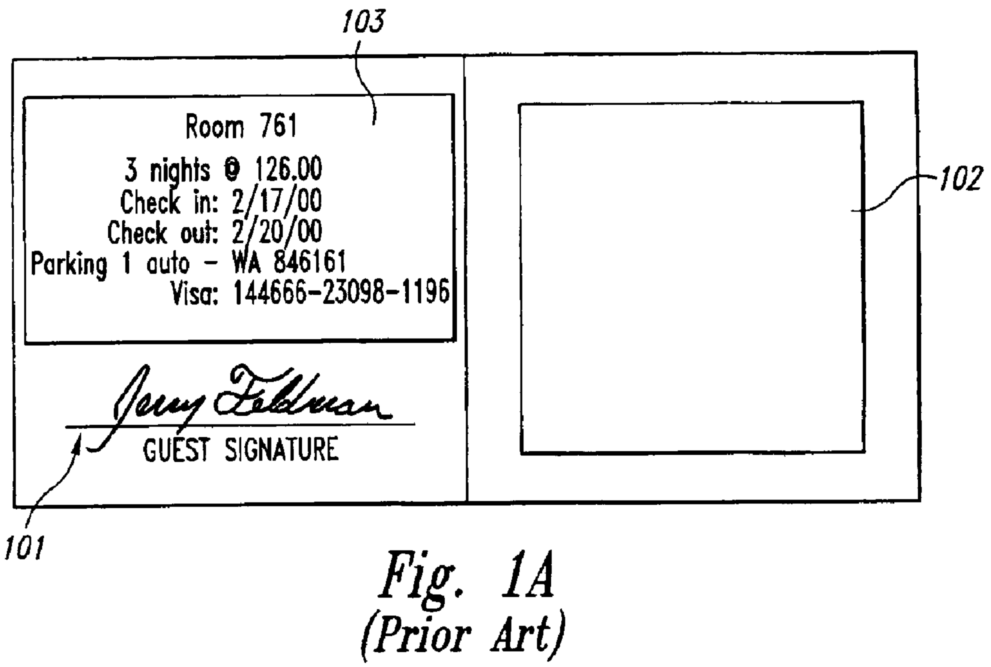
Fig. 1A (Prior Art)
FIG. 1A shows an example currently-used hotel registration form.
Figure 1B:
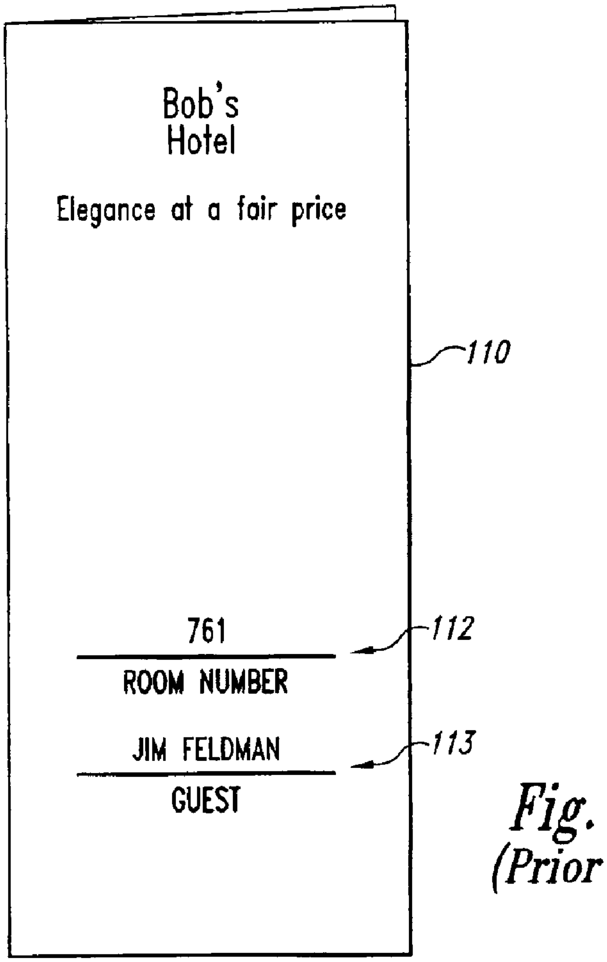
Fig. 1B (Prior Art)
FIG. 1B shows a typical key packet as presented to a guest during the registration process.
Figure 1C:
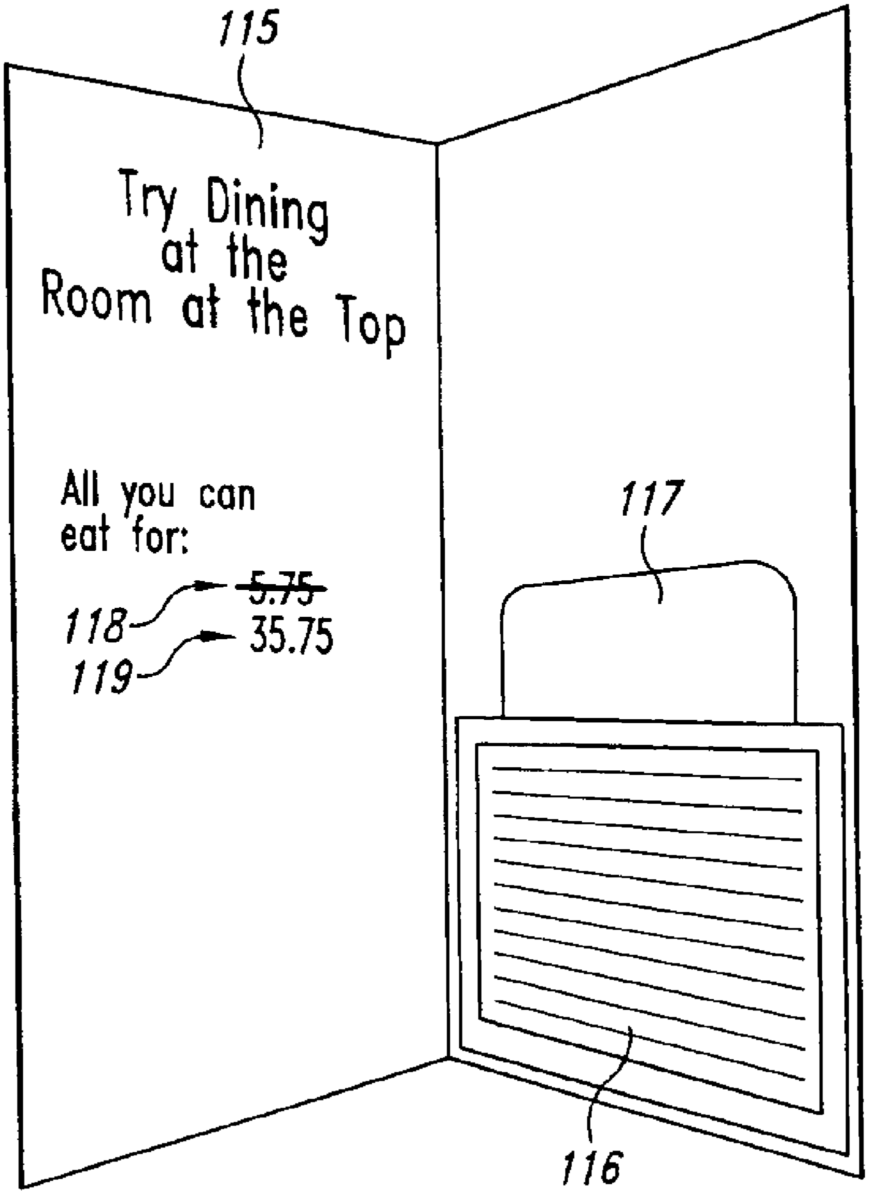
Fig. 1C (Prior Art)
FIG. 1C shows a typical key packet opened to display the magnet key card.
Figure 4:
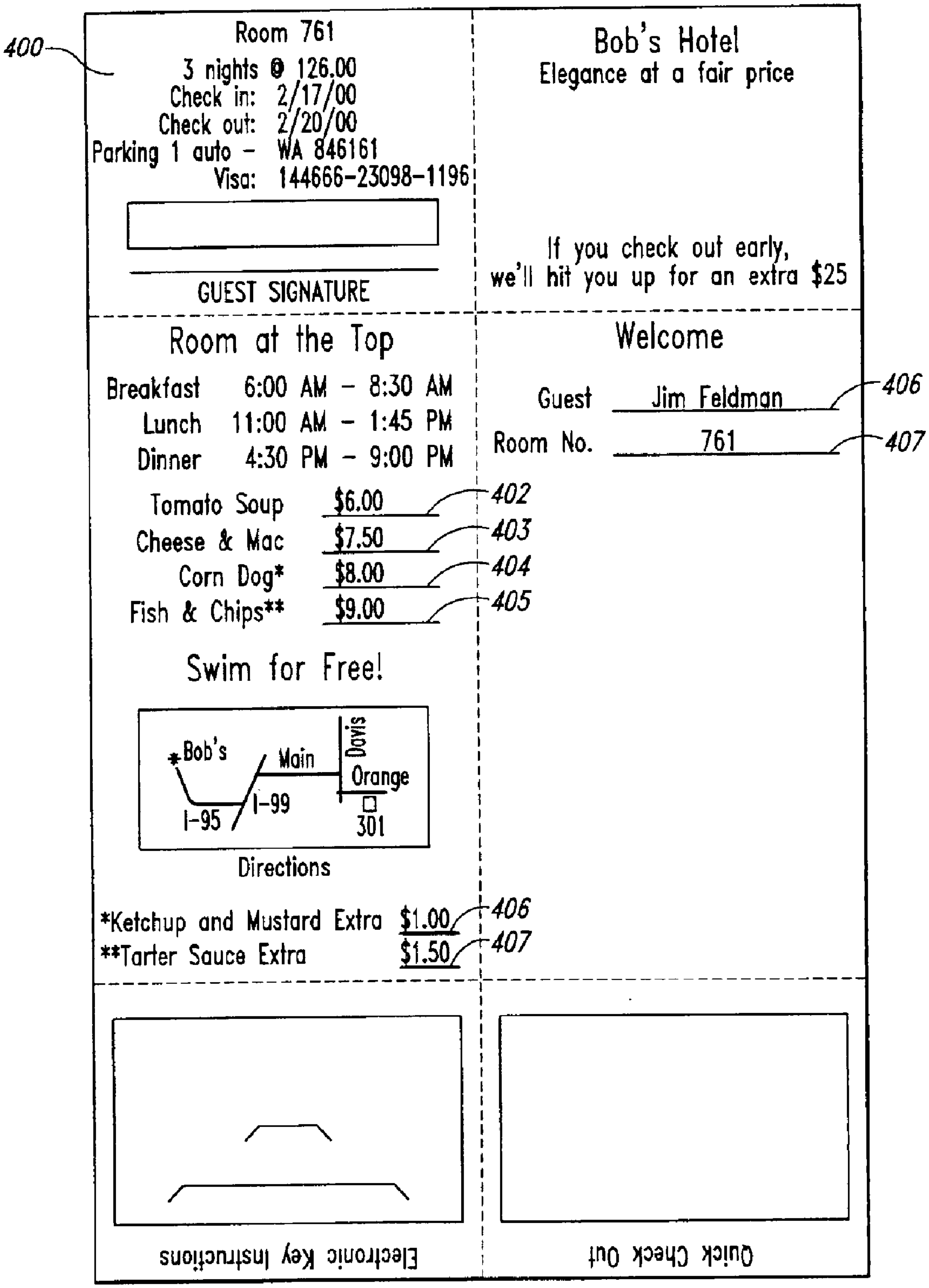
FIG. 4 shows the single-sheet registration form and key packet of FIGS. 2–3 following printing of the registration form and key packet by a laser printer or other automated printing device during a registration process.

FIG. 4 shows the single-sheet registration form and key packet of FIGS. 2–3 following printing of the registration form and key packet by a laser printer or other automated printing device during a registration process. Various frequently changing or time-sensitive information, such as prices 402–407, have been printed in designated locations, along with information particular to the registree, including the name of the registree 406, a room number 407, and additional information related to the registration 408 that was printed in text block 103 of the pre-printed registration form shown in FIG. 1A.

Typically, during a registration process, a hotel clerk inquires for and obtains from a registering guest an identification number or name by which the hotel clerk can access any information concerning the registration already stored within a computer system that runs registration software. The hotel clerk then interacts with the registering guest to obtain any additional information needed for registration, typically keying the information into a keyboard connected to the registration computer system. The single-sheet registration form and key packets are typically loaded into a dedicated tray within a laser printer or other automated printing device. The hotel clerk may initiate printing of the single-sheet registration form and key packet by keying a command to the keyboard or inputting the command to a touch screen connected to the computer system. The registration software transmits the command to the laser printer, including particular guest information to be printed and software templates or references to already-loaded software templates that together comprise all the information needed by the laser printer to print a single-sheet registration form and key packet, as shown in FIG. 4.

Figure 5:
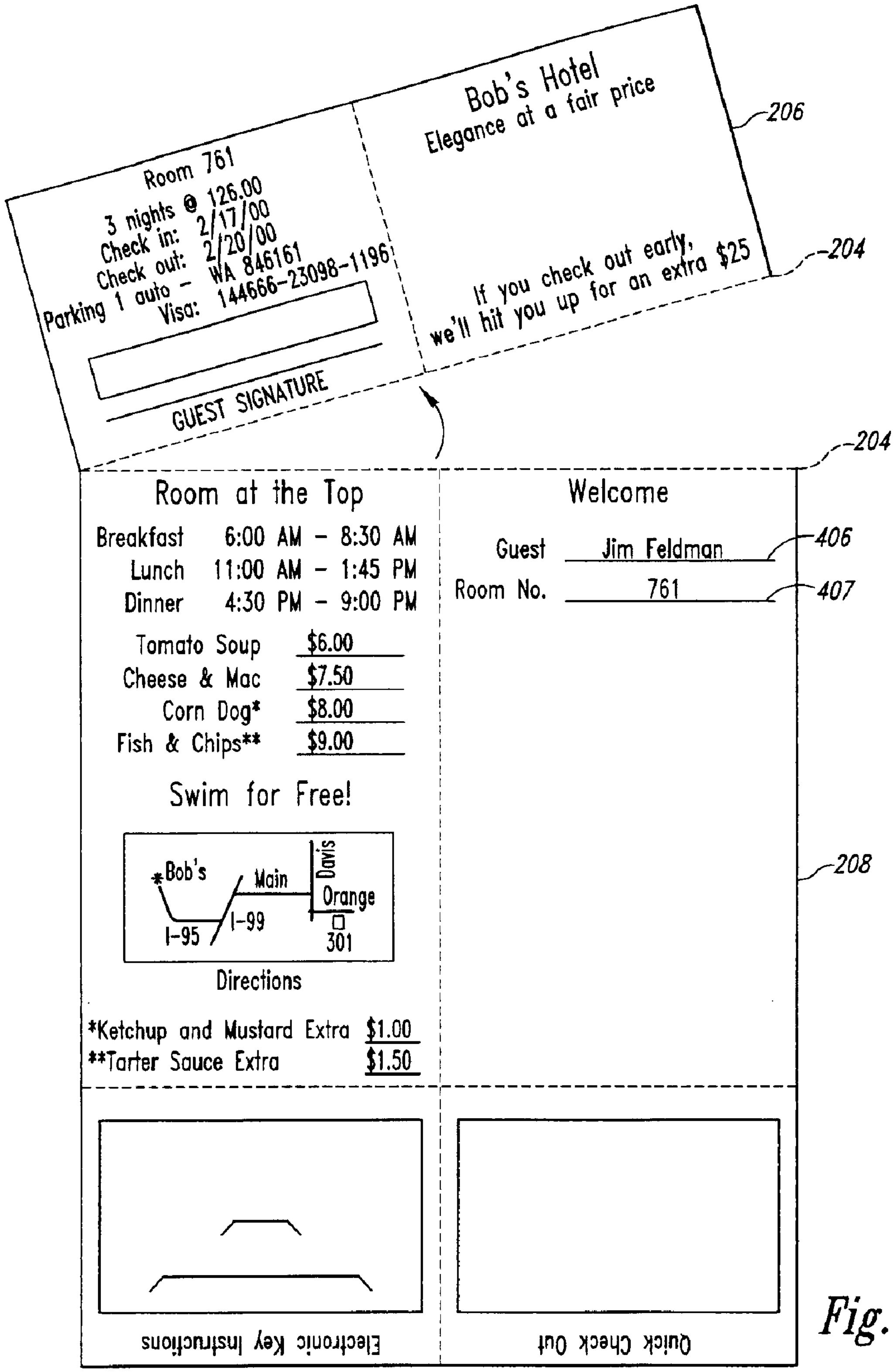
FIGS. 5–9 illustrate the steps carried out by a hotel clerk to provide a registering guest with a separate registration form and key packet starting with the laser-printed single-sheet registration form and key packet shown in FIG. 4.

FIGS. 5–9 illustrate the steps carried out by a hotel clerk to provide a registering guest with a separate registration form and key packet, starting with the laser-printed single-sheet registration form and key packet shown in FIG. 4. First, as shown in FIG. 5, the hotel clerk separates the registration form 206 from the key packet 208 along the horizontal line of perforations 204. Alternatively, this separation of the registration form from the key packet may be automatically carried out by a specialized mechanical apparatus included in an automated printing device. Once the registration form 206 has been separated, it is provided to the registering guest by the hotel clerk.

Figure 6:
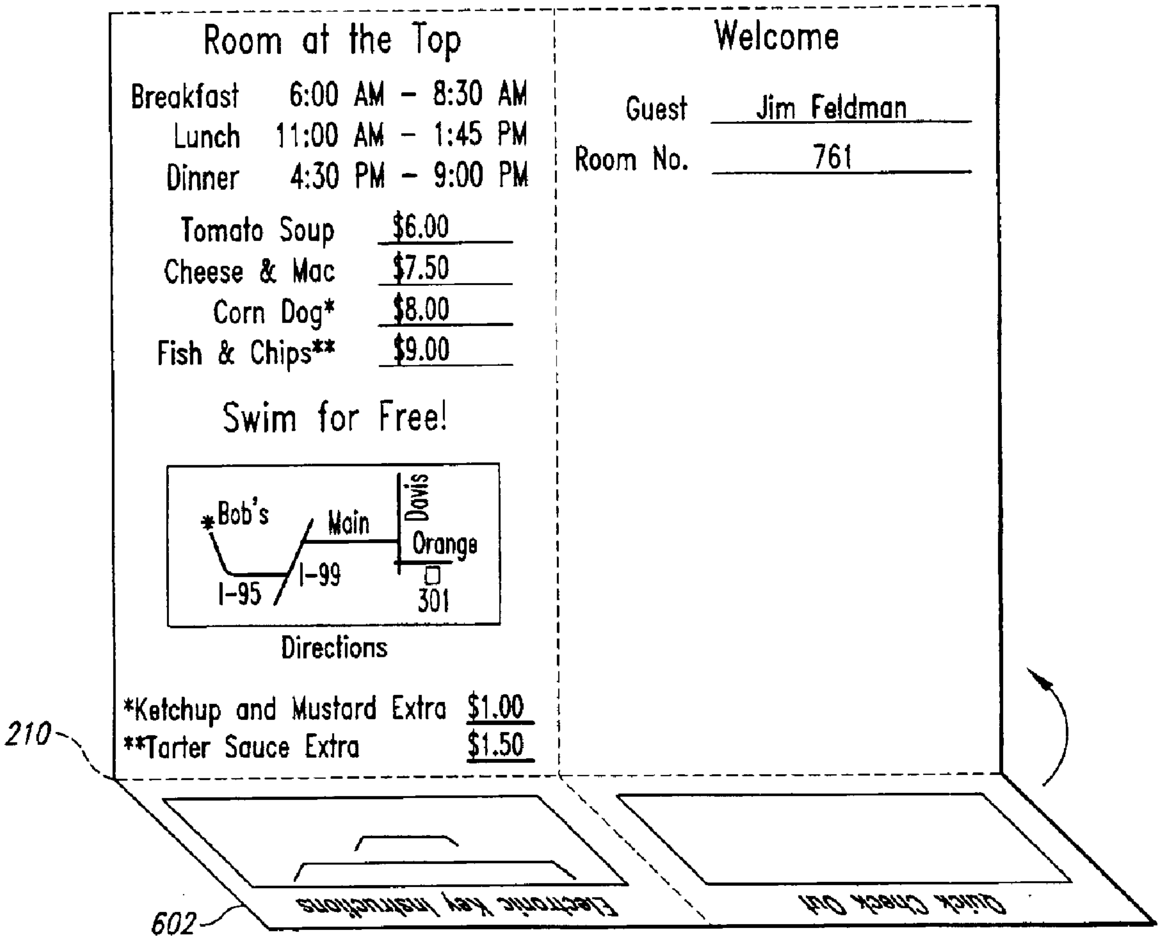
Figure 7:
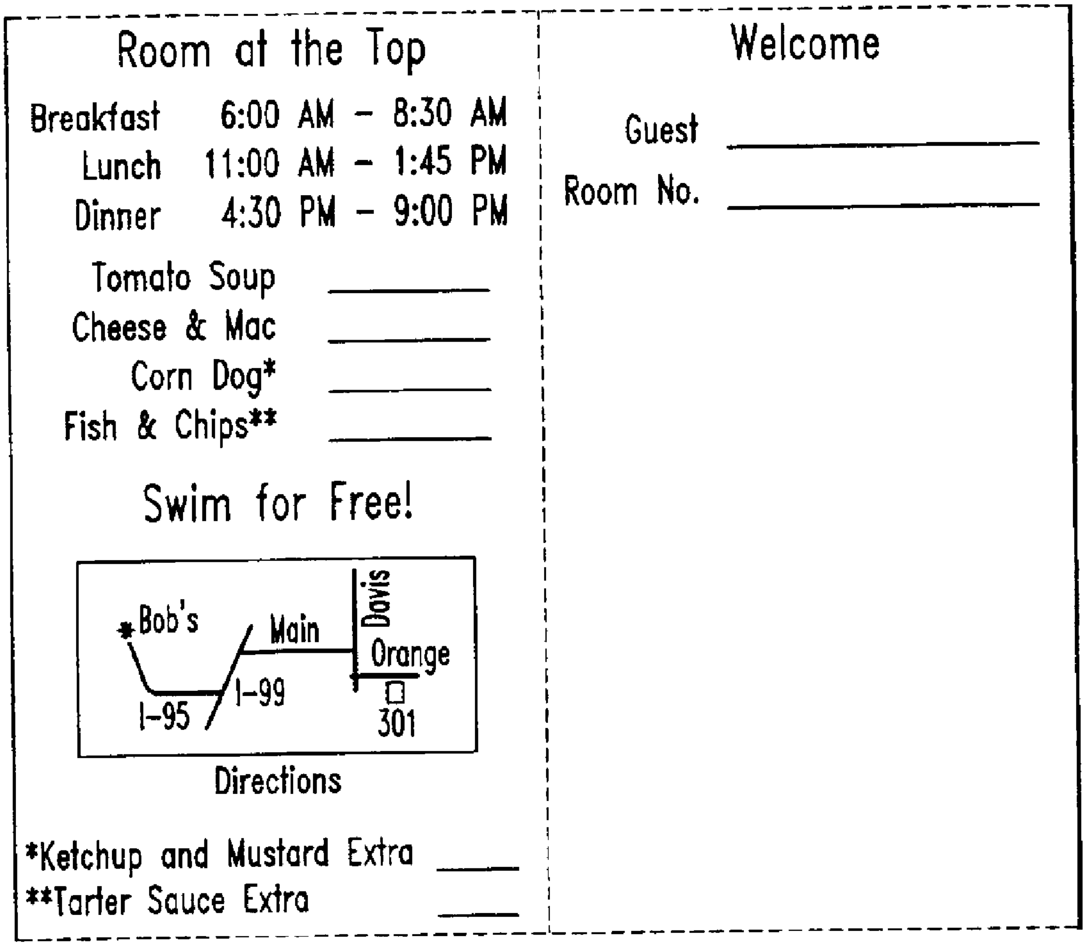
Figure 8:
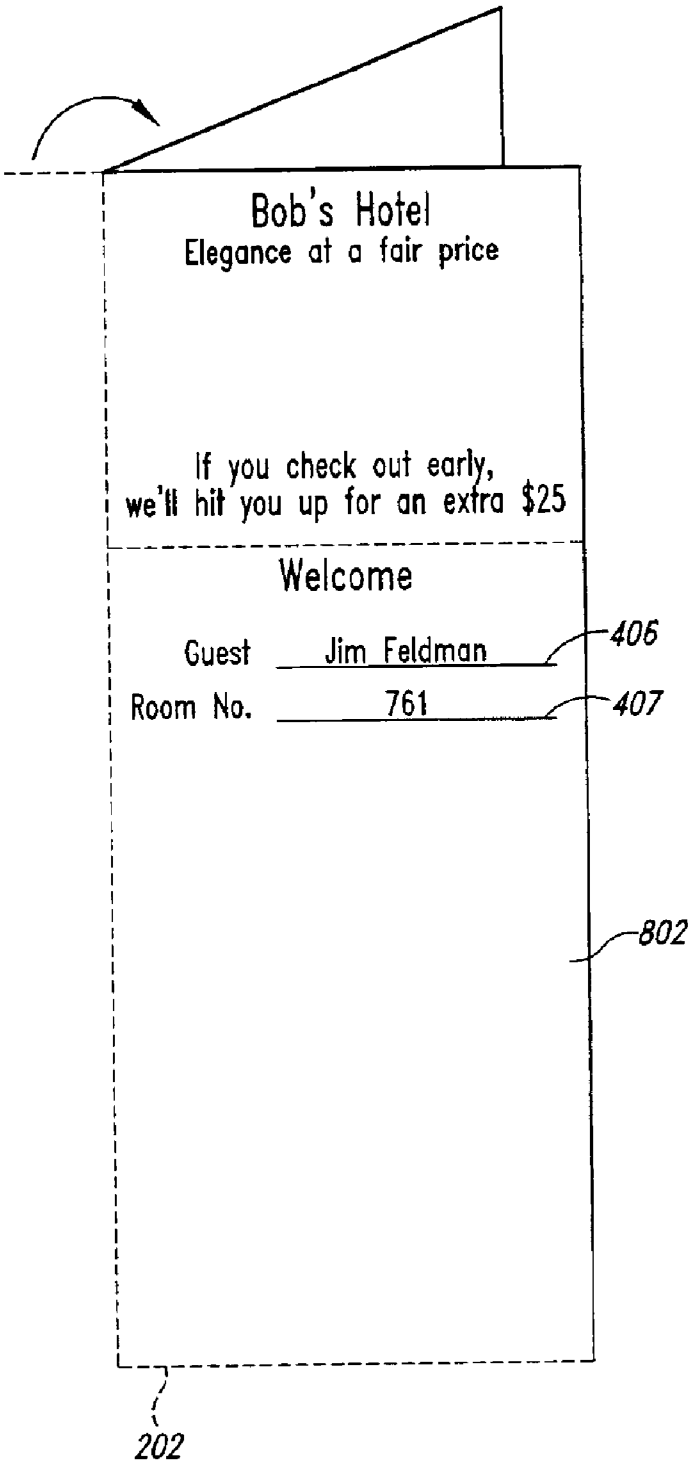
Figure 9:
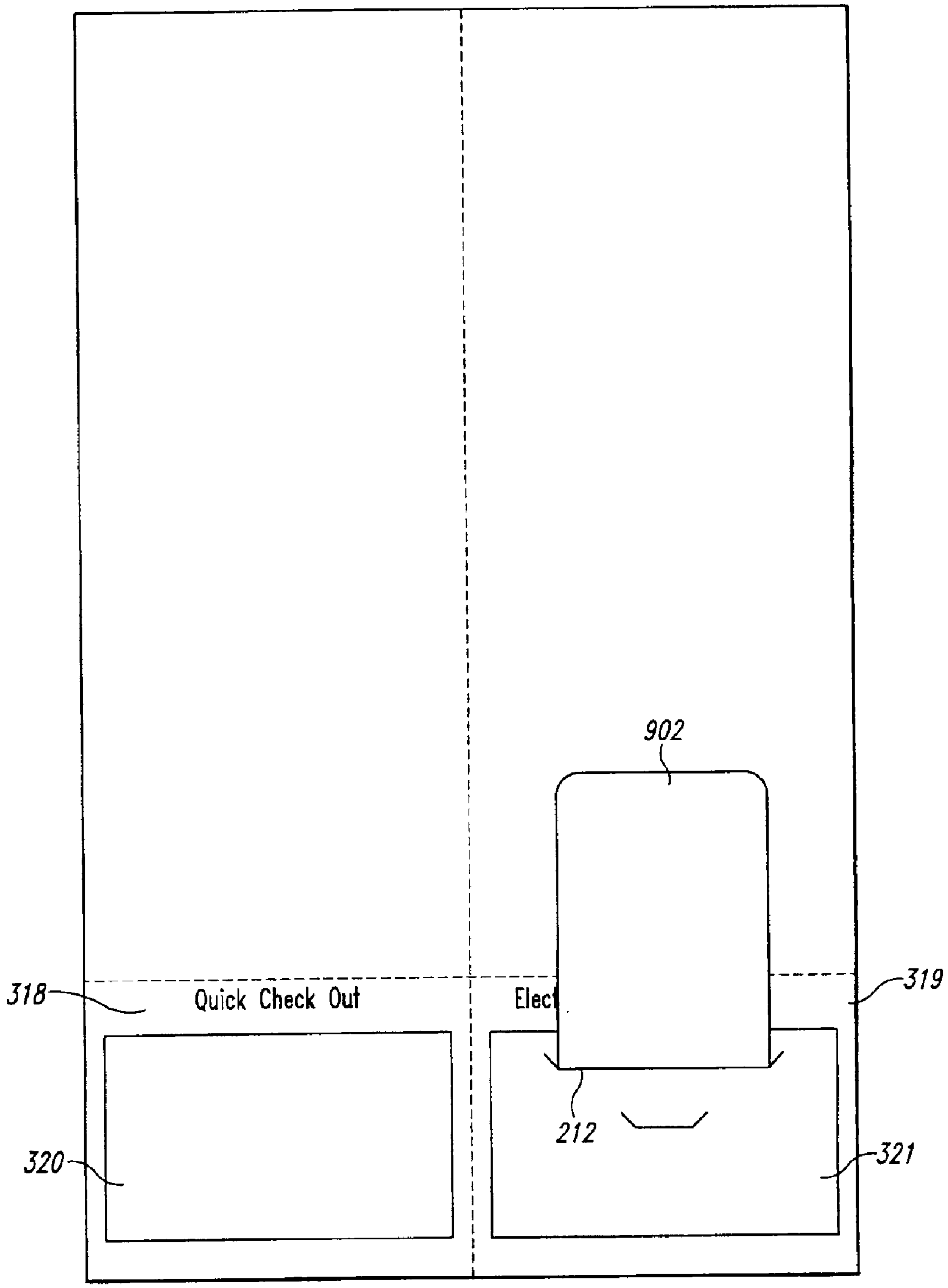

While the registering guest is reading and signing the registration form (206 in FIG. 5), the hotel clerk constructs the key packet by the steps shown in FIGS. 6–9. First, as shown in FIG. 6, the hotel clerk folds the lower portion 602 of the key packet behind the plane of the key packet along the horizontal line of perforations 210. This produces a partly constructed key packet, as shown in FIG. 7. Next, as shown in FIG. 8, the hotel clerk folds the key packet along the vertical line of perforations 202 to produce the final folded key packet. The printed guest's name and room number 406 and 407, respectively, appear on the front face 802 of the key packet. FIG. 9 shows the key packet as it appears when unfolded. The additional printed advertisement and information 318–321 appear in a correct orientation for reading, and a magnetic keycard 902 has been inserted into the dye-cut slot 212 by the hotel clerk.

Although the present invention has been described in terms of a particular embodiment, it is not intended that the invention be limited to this embodiment. Modifications within the spirit of the invention will be apparent to those skilled in the art. For example, different sizes of single-sheet registration form and key packets may be used, depending on the needs and desires of the registering organization and on the capabilities of laser printers or other automated printing devices. In alternative embodiments, different types of pre-printed information may be employed, and relatively static information may be either pre-printed, generated from stored software templates, or provided by a combination of both techniques. Different numbers and orientations of perforation lines may be used to construct registration forms and key packets of different shapes and dimensions. In the above example, the single-sheet registration form and key packet is rectangular, but, in alternative embodiments, the single-sheet registration form and key packet may be square, or may have any number of different shapes. While the embodiment described above relates to registration of hotel and motel guests, the present invention may be applied to a wide variety of other registration processes used in a wide variety of commercial and non-profit organizations.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for registering a registree, the method comprising:

obtaining information from the registree related to registering the registree and entering the obtained information into a computer system;

invoking a software routine to transmit the information obtained from the registree to a printing device connected to the computer system;

printing by the printing device a single-sheet registration form with an attached unconstructed key packet;

including printing the information obtained from the registree;

separating the registration form from the unconstructed key packet;

providing the registration form to the registree for the registree to read and sign;

folding the unconstructed key packet into a constructed key packet;

inserting into the key packet a key; and presenting the constructed key packet including the key to the registree.

2. The method of claim 1 further including:

printing by the printing device a single-sheet registration form with an attached unconstructed key packet, including printing the information obtained from the registree and information encoded in software templates.

3. The method a claim 1 wherein the single-sheet registration form with an attached unconstructed key packet is pre-printed with textual, graphical, or textual and graphical information.

* * * * *